July 11, 1933.  G. B. MILLER, JR  1,917,806
CUT-OFF MECHANISM FOR TUBE MACHINES
Filed Jan. 25, 1932
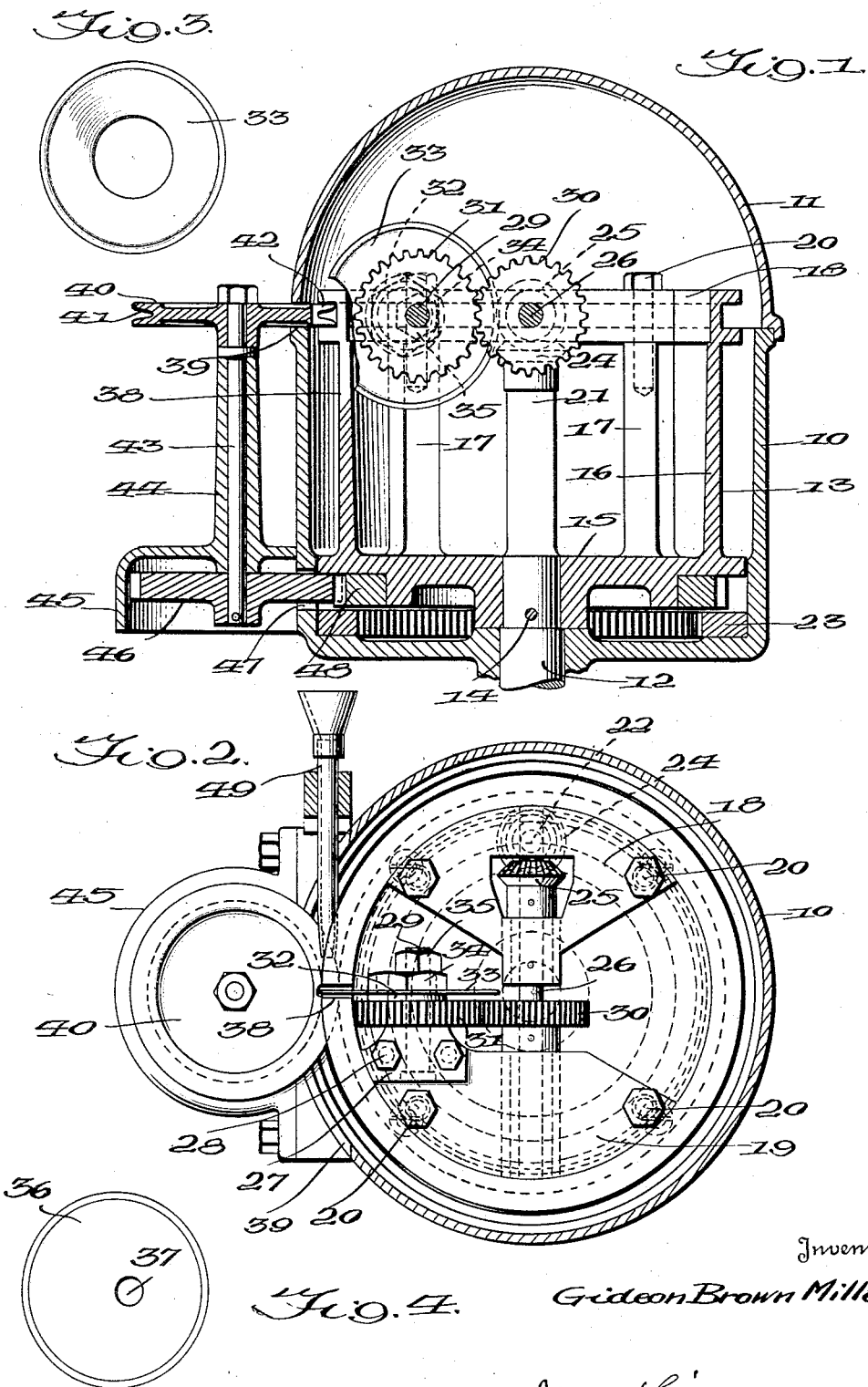
Inventor
Gideon Brown Miller, Jr.
By James Whitehales
Attorney Patented July 11, 1933

1,917,806

UNITED STATES PATENT OFFICE

GIDEON BROWN MILLER, JR., OF WASHINGTON, DISTRICT OF COLUMBIA, ASSIGNOR TO STONE STRAW CORPORATION, OF WASHINGTON, DISTRICT OF COLUMBIA, A CORPORATION OF DELAWARE

CUT-OFF MECHANISM FOR TUBE MACHINES

Application filed January 25, 1932. Serial No. 588,721.

This invention relates to cut-off mechanism for tube machines, and it comprises an eccentrically mounted rotary cutter which, simultaneous with its rotation, is revolved about an offset axis, whereby the cutter will be projected periodically into the path of a tube to be cut by reason of its eccentric rotation, and, in approaching and receding from such path, will travel in the direction of movement of the tube from the mechanism which forms it, together with means for guiding and supporting the tube adjacent the point of cut; all as will be described hereinafter and as claimed.

In the manufacture of tubes of small bore, particularly those known as artificial straws, it is the common practice to form the tube on a mandrel and to feed it continuously from the mandrel to a mechanism for cutting it into convenient lengths. Inasmuch as the formed tube is continuously in motion as it is fed to the cut-off it is desirable to move the knife or other cutter bodily in the direction of movement of the tube and at approximately the same speed during a cutting operation, thereby to prevent buckling of the tube as might result if the cutter were operated in a fixed plane across its path.

Heretofore, it has been the practice to mount the cutter for orbital movement about an axis parallel with its own axis of rotation in order that it might be presented for cutting only at predetermined intervals. I have found, however, that this same effect of periodically bringing the cutter into the path of the tube can be accomplished with a simplified movement and mechanism which comprises, essentially, a knife or cutter mounted eccentrically so that in its rotation the cutting blade will be projected periodically into the path of the formed tube which it is desired to cut into lengths.

It is, accordingly, an object of this invention to provide a cut-off for tube machines comprising an eccentrically mounted cutter adapted to be rotated, whereby its cutting edge is periodically projected into the path of a tube to be cut.

A further object is to provide a cut-off for tube machines which comprises an eccentrically mounted cutter adapted for rotation about a horizontal axis, together with means for causing a revolution of such cutter about an offset vertical axis, whereby when the cutter severs a tube by reason of its eccentric mounting it is moved bodily in the direction of travel of the tube and at substantially the same speed as that of the tube.

Other and further objects will be apparent from the following description and drawing, in which Figure 1 is a vertical sectional view of the cut-off mechanism comprising this invention;

Figure 2 is a top plan view of the mechanism with the casing cover removed;

Figure 3 is a detail view of the preferred form of cutter;

Figure 4 is a detail view of a modified form form of cutter;

Referring more particularly to the drawing:

A fixed housing 10, having a removable cover 11, is attached to a machine bed (not shown) in any convenient manner and serves as a bearing for the upper end of a vertical drive shaft 12 which, as shown, is shouldered for sustaining a rotatable turret 13 to which it is fastened as by means of a pin 14. The turret comprises a base 15 and an upstanding annular wall 16, spaced from the fixed housing.

The annular wall of the turret, preferably, has spaced circumferential flanges extending outwardly adjacent its upper edge, and its interior is formed with integral ribs 17 upon the upper ends of which bearing plates 18 and 19 are sustained and held in position by screws 20 which are tapped into the ends of the ribs. As an additional support for the bearing plates the interior wall of the turret may be machined to form an annular shoulder as is shown in Figure 1 of the drawing.

Another protuberance 21 is cast integrally with the wall 16 and is journalled to receive a vertical shaft 22 having a pinion at its lower end (not shown) in mesh with the teeth of internal gear 23 which is removably mounted in housing 10. A bevel gear 24, affixed to the upper end of vertical shaft 22, meshes with a similar bevel gear 25 on a cross shaft 26 which is journalled in plates 18 and 19.

The bearing plate 19 has an area of reduced thickness into which a strap or bridge piece 27 is fitted and retained by screws 28, the bearing plate and bridge piece, together, defining a support or bearing for pintle 29.

A gear 30 is fast upon cross shaft 26 and meshes with a gear 31 which is mounted for rotation upon or with pintle 29. If it is to be rotated upon the pintle anti-friction bearings may be provided for this purpose, or if the gear is fast on the pintle, the pintle may be anti-frictionally mounted in its bearing.

Gear 31 has an eccentric hub portion 32, a section of which is of reduced diameter to define a shoulder against which the cutter 33 abuts, and its outer end is threaded to receive a nut 34 which holds the cutter in position. The gear and cutter assembly are retained on the pintle 29 by a nut 35.

In the form of invention just described the cutter has a central opening which fits the eccentric of the gear, and which, being centrally located, will facilitate mounting of the cutting element 33 in a machine for resharpening it when it becomes dull.

While the cutter is shown of circular shape it is to be understood that it could, instead, be formed as an irregularly shaped body, and instead of having a knifelike cutting edge it could be formed with saw teeth, all without departing from this invention.

In the modification shown in Figure 4 the circular cutter 36 has a pintle receiving opening 37 offset from its center. In the use of this modified structure the cutter is mounted to rotate with the pintle as is also the driving gear, whereas in the preferred form of invention the mounting of the pintle 29 for rotation is optional. Furthermore, in order to neutralize any vibrations which might be set up by the eccentric rotation of the cutter in use, counterweights may be integrally cast with the cutter or attached to it to effect an equal distribution of its mass.

The turret is slotted at 38 for the free passage of the cutter beyond the confines thereof in its travel within the fixed housing, and the housing is horizontally slotted at 39 so that a circular tube guide 40 may extend through its wall into the path of the cutter and between the circumferential flanges of the turret. The guide has an annular groove 41 for tangentially receiving and supporting a tube to be cut, and is radially slotted at 42 for passage of the cutter through the tube adjacent the point of its support.

The guide 40 is mounted on a shaft 43 which is journalled in a supporting member 44 provided with a depending skirt 45. A gear 46, protected by the skirt member 45, extends through a slot 47 in the lower part of the housing and meshes with a ring gear 48 which is mounted on the turret.

The tube may be additionally guided to the cutter by a tubular guide 49 which has a bell mouth, and is shown in Figure 2, for locating and directing the tube as it comes from the forming mechanism. The particular type of guide does not form a part of the present invention, except insofar as it cooperates with the eccentrically mounted cutter, and it is entirely within the scope of the invention to use either or both of the guides shown in the drawing, or any type of guide which will furnish adequate support for a paper tube or straw adjacent the point of cut.

In operation, upon rotating the turret the knife or cutter is revolved about the turret axis and at the same time it is also rotated about its own axis by the gearing described. Inasmuch as the axis of rotation of the cutter is offset from its center its cutting edge will be projected through the slot in the turret at each revolution.

At one point in its revolution about the turret axis it is presented to a tube which is projected through the housing and tangentially of the turret by means of the guide. At this point the outward, slashing motion of the cutting edge will sever the tube and at the same time the bodily movement of the cutter about the turret axis is at substantially the same rate as the travel of the tube so that danger of buckling of the moving tube against the cutter blade is obviated.

What I claim as my invention is:

1. Cut-off mechanism for tubes comprising a rotary cutter having its axis of rotation located off-center so that its cutting edge is periodically projected outward into the path of a moving tube, and means for bodily moving said cutter in the direction of travel of the tube at the point of cut.

2. A cut-off mechanism for tubes comprising a cutter mounted for rotation about an axis offset from its center, gearing for rotating said cutter to project it periodically into the path of a continuously formed tube thereby to cut the tube into lengths and means for bodily revolving said cutter about an axis offset therefrom whereby as the cutter is projected into the path of the tube it is bodily moved in the direction of movement of the tube.

3. A cut-off mechanism for tubes comprising a circular cutter, a gear for rotating the same, said gear having an eccentric boss upon which said cutter is mounted, and means for retaining the cutter thereon, whereby its cutting edge will be projected periodically into the path of a tube to be cut.

4. A cut-off mechanism for tubes comprising an eccentrically mounted cutter, gearing for rotating said cutter thereby to project its cutting edge outwardly upon each revolution thereof, and means for bodily revolving said cutter about an axis offset therefrom, together with a guide for projecting a formed tube into the path of the cutting edge of the cutter at a point in its bodily movement about said offset axis.

5. A cut-off mechanism for tubes comprising an eccentrically rotatable cutter, gearing for rotating said cutter, means for bodily revolving the cutter about an axis offset therefrom, a circular, slotted tube guide extending into the path of revolution of said cutter, said tube guide being rotatable in unison with the revolution of said cutter and at substantially the speed of formation of the tube to be cut, whereby the cutting edge of said cutter will be projected outwardly into the slot of the tube guide and through the formed tube at a predetermined point in its bodily movement about the offset axis.

6. A cut-off mechanism for tubes comprising a stationary housing, a shaft having a turret secured thereto, the shaft and turret fitted to rotate within parts of the housing, a stationary gear carried by said housing, two shafts journalled in the turret at right angles to each other, each having a transmission gear whereby motion of the one is transmitted to the other, a pinion on one of said shafts engaging the teeth of said stationary gear to effect rotation of the shafts carried by the turret when such turret is rotated, a pintle having a gear thereon in mesh with a second gear driven from one of said shafts carried by the turret, and an eccentrically mounted rotary cutter on said pintle, the edge of said cutter being periodically projected beyond the confines of the turret by reason of such eccentric mounting, and tube guiding means for projecting a formed tube tangentially of the turret and in position to be severed by said cutter in its eccentric rotation and during its revolution about the axis of the turret.

In testimony whereof I affix my signature.

GIDEON BROWN MILLER, Jr.